United States Patent

Kurahashi et al.

[15] 3,702,896

[45] Nov. 14, 1972

[54] VIDEO INFORMATION RECORDING MEDIA AND APPARATUS FOR REPRODUCING VIDEO INFORMATION

[72] Inventors: Koichiro Kurahashi; Masanori Nakada, both of Hyogo; Masaaki Abe, Kyoto; Koichi Nishimura, Kamakura, all of Japan

[73] Assignee: Mitsubishi Electric Corporation, Tokyo, Japan

[22] Filed: Oct. 20, 1970

[21] Appl. No.: 82,375

[30] Foreign Application Priority Data

Oct. 31, 1969 Japan ......................44/87393

[52] U.S. Cl. ............178/5.2 R, 178/5.4 CD, 178/6.7

[51] Int. Cl. ..............................................H04n 5/86

[58] Field of Search .178/5.4 CD, 6.7 A, 6.7 R, 5.2 R

[56] References Cited

UNITED STATES PATENTS 3,236,943 2/1966 Moller ....................178/6.7 A 3,522,371 7/1970 Goldmark ...........178/5.4 CD

FOREIGN PATENTS OR APPLICATIONS 1,041,590 9/1966 Great Britain ........178/5.4 ST

OTHER PUBLICATIONS

Patchett, Color Television, 1967, pp. 131–137.

*Primary Examiner*—Robert L. Griffin

*Assistant Examiner*—John C. Martin

*Attorney*—Oblon, Fisher & Spivak

[57] ABSTRACT

A video information recording media and apparatus for reproducing video information recorded on the media is provided. A luminance signal Y and a color signal (R-Y) is recorded on one side of the recording media and a luminance signal Y and a color signal (B-Y) is recorded on an adjacent side of the recording media. The color video information upon the recording media is reproduced by the use of a flying spot scanner which horizontally scans the recording media and alternately reads the Y and (R-Y) signal and the Y and (B-Y) signal and by the use of a delay is able to compose the desired information therefrom.

2 Claims, 14 Drawing Figures

INVENTORS
KOICHIRO KURAHASHI
MASANORI NAKADA
MASAAKI ABE
KOICHI NISHIMURA
BY Oblon, Fisher and Spivak
ATTORNEYS

PATENTED NOV 14 1972

3,702,896

INVENTORS
KOICHIRO KURAHASHI
MASANORI NAKADA
MASAAKI ABE
KOICHI NISHIMURA
BY
Oblon, Fisher & Spivak
ATTORNEYS

INVENTORS
KOICHIRO KURAHASHI
MASANORI NAKADA
MASAAKI ABE
KOICHI NISHIMURA

BY Oblon, Fisher & Spivak
ATTORNEYS

VIDEO INFORMATION RECORDING MEDIA AND APPARATUS FOR REPRODUCING VIDEO INFORMATION

BACKGROUND OF THE INVENTION

1. Field of the Invention:

The present invention generally relates to a monochromatic video information recording media on which color video information is recorded, and more particularly to an apparatus for reproducing the video information recorded on the recording media.

2. Description of the Prior Art:

In the past, while somewhat satisfactory, it was very difficult to provide a large amount of video information on a recording media, such as an optical film, and for providing apparatus for reproducing the same.

SUMMARY OF THE INVENTION

Accordingly, it is an object of the present invention to provide a new and improved unique monochromatic video information recording media upon which color video information is easily recorded with a relatively high density.

Another object of the present invention is to provide a new and improved unique apparatus for easily reproducing video information which is recorded upon a recording media.

Briefly, in accordance with the present invention, these and other objects are, in one aspect, attained by the provision of a video information recording media in which video information placed thereon is separated into a plurality of horizontal components which are sequentially recorded in the direction that the recording media is moved. The recording media is characterized in that each horizontal component on the recording media consists of two separate sections, each of which contains a signal which overlaps a luminance signal. The first color signal of the video information is recorded on the first horizontal section and the second color signal of the video information is recorded on the second horizontal section.

Moreover, in accordance with the present invention, in another aspect, an apparatus for reproducing video information from a recording media, such as described above, is provided. The apparatus for reproducing the video information from the recording media includes a flying spot scanner for alternately reading the signals placed on the first and second horizontal sections in a direction which is transverse to that of the recording media. Means are further provided for alternately delaying the first and second color signals produced at the output of the reading means for one horizontal scanning period. First and second color signal demodulation circuits are provided for alternately supplying the first color signal delayed by the delaying means and the second color signal (passed without delay) during a first period of time and for supplying the first color signal without delay and the second color signal being delayed by said delaying means during a second period of time.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
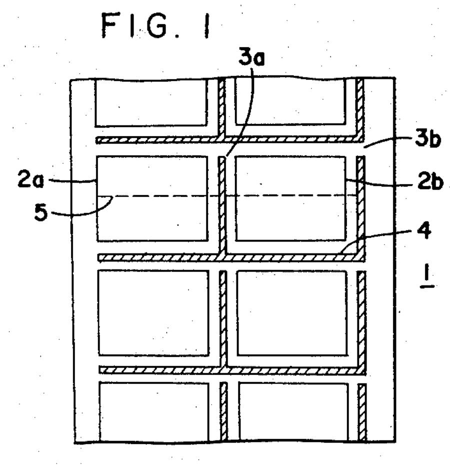
FIG. 1 shows a partial view of one preferred embodiment of a recording media for recording video information in accordance with the present invention.

In reference to the drawings, as hereinafter described, it should be understood that like reference numerals designate identical or corresponding parts throughout the several views.

In a preferred embodiment of the present invention, an optical film is used for the recording media. It should be understood, however, that the invention is not so limited and that other recording medii, such, for example, as of the thermoplastic type, may be readily employed as the recording media. Moreover, it should be noted that in general, color video information deals separately with a luminance signal and two color signals. Thus, for example, the two color signals may be color difference signals such as red - luminance (R-Y), and blue - luminance (B-Y). It should be understood, however, that the invention is not so limited and that other kinds of color signals such as I, Q or X, Z signals could be readily used. By way of example, the following embodiments will be described with the use of the color difference signals (R-Y) and (B-Y).

Figure 2:
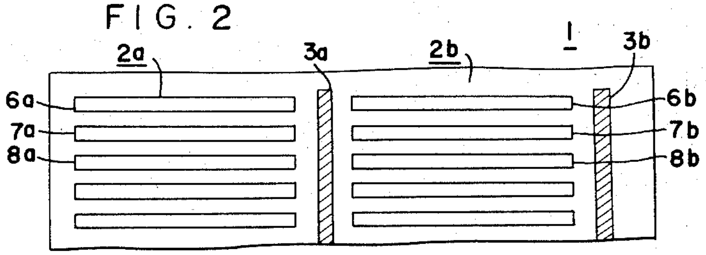
FIG. 2 shows a partially enlarged view of the recording media shown in FIG. 1.

Referring now to FIGS. 1 and 2, a partial view of an optical film 1 for use as the recording media for video information and a partially enlarged view thereof is shown. In FIGS. 1 and 2, the color video information is recorded on picture frames 2*a* and 2*b* which are arranged in two columns along the optical film. At the right side of both of the picture frames 2*a* and 2*b*, horizontal synchronizing marks 3*a* and 3*b* are provided. Also, a vertical synchronizing mark 4 is provided under both of the frames 2*a* and 2*b*.

It should be understood that as the surface of the optical film 1 is scanned from the left edge thereof to the right edge by the flying spot scanner that the picture frame 2*a*, the horizontal synchronizing mark 3*a*, the picture frame 2*b*, and the horizontal synchronizing mark 3*b* will be sequentially read. The horizontal synchronizing marks 3*a*, 3*b*, and the vertical synchronizing mark 4 may be a mark having a transparent or opaque nature in a stripe type pattern. It should be apparent that the invention is not so limited and that the synchronizing marks may be of various shapes and types so long as the same will provide the desired vertical or horizontal synchronizing signals when scanned by a horizontal scanning luminance spot 5 supplied in the transverse direction by the flying spot scanner. For convenience of illustration, the color video information which is recorded on the picture frames 2a and 2b is shown in the form of plural lines 6a, 6b, 7a, 7b, 8a and 8b which are connected in the transverse direction, but are separated in the longitudinal direction. The signals which overlap the luminance signal and the color difference signal (R-Y) are recorded in the picture frames 2a, while the signals which overlap the luminance signal and the color difference signal (B-Y) are recorded in the picture frames 2b.

During a single scan of the optical film 1 by the horizontal scanning luminance spot 5 moving in the transverse direction, one frame of the color video information will be read from two of the picture frames 2a and 2b. This is because in each pair of picture frames 2a and 2b, one frame of the color video information is therein recorded.

Figure 3:
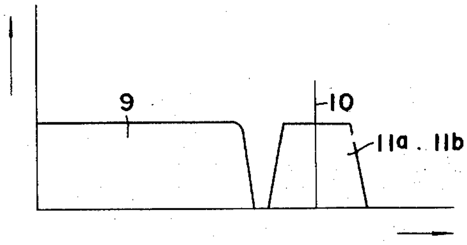
FIG. 3 shows a graph of the frequency spectrum of the video information recorded in the embodiment shown in FIG. 1.

Referring now to FIG. 3, a graph of the frequency spectrum of the color video information recorded in the picture frames 2a or 2b is therein shown. In the graph, the luminance signal 9 is shown as occupying a frequency band from direct current to several MHZ and the color signal 11a is shown as being provided by a frequency modulation of a color carrier wave 10 with the color difference signal (R-Y) or (B-Y). The frequency band space may be, for example, zero to 3.6 MHZ for the luminance signal 9 and 3.7 to 4.7 MHZ for the color signal 11a or 11b and 4.2 MHZ for the color carrier wave 10.

It should be understood that if the frequency of the color carrier wave 10 is made an integral number of times 15.7 KHZ of the horizontal scanning frequency that high quality color video can be reproduced without the generation of any unnecessary beat signals between the luminance signal 9 and the color signal 11.

Figure 4:
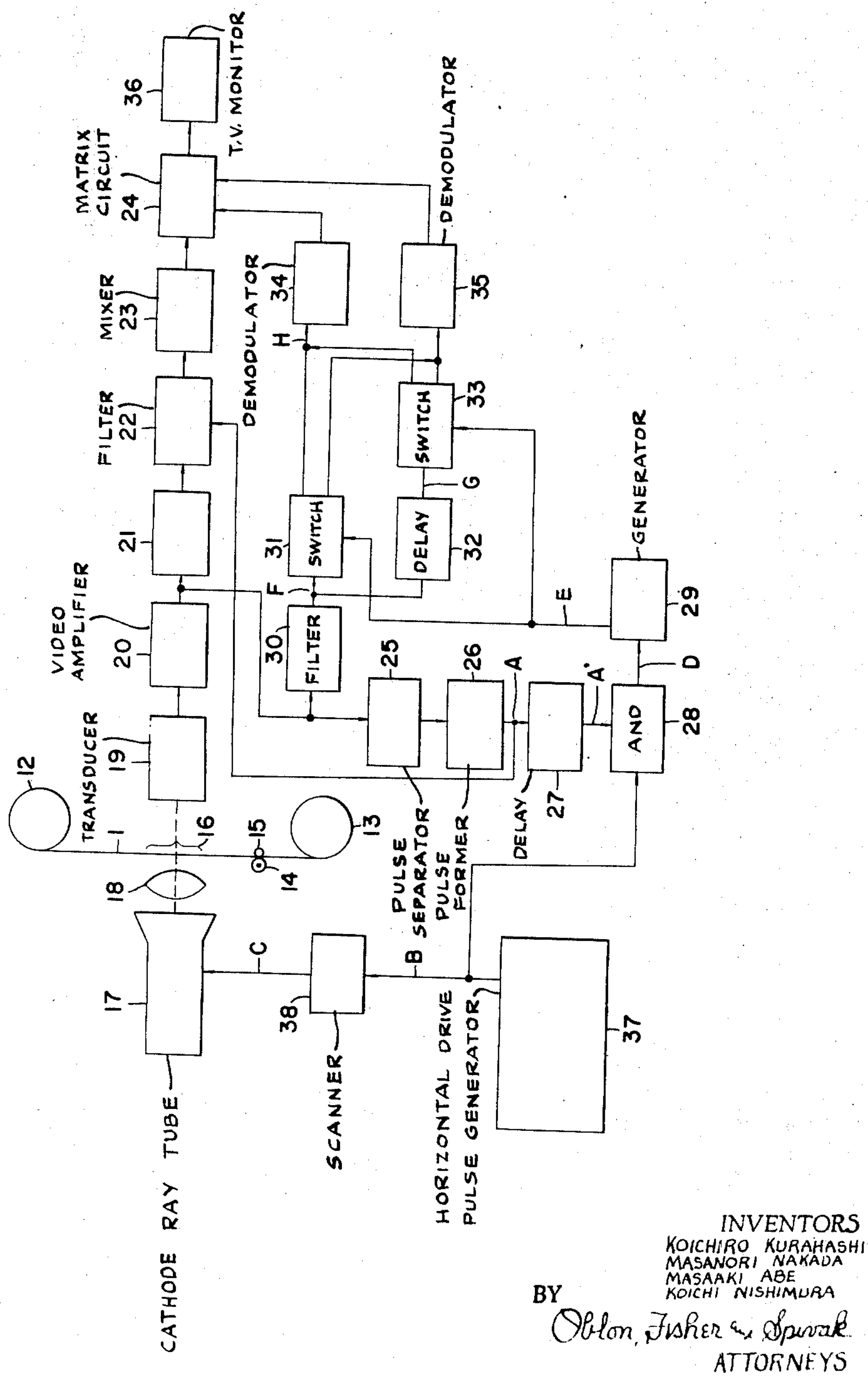
FIG. 4 shows a schematic block diagram of a preferred embodiment of the apparatus for reproducing video information by employing the video information recording media of the present invention; and, FIGS. 5A thru 5I show a plurality of typical signal waveform diagrams for various locations among the apparatus shown in FIG. 4.

With reference to FIG. 4, a preferred embodiment of an apparatus for reproducing the video information recorded on the recording media of the present invention is shown. In FIG. 4, the optical film 1 is shown as being supplied from a supply reel 12 and as being wound upon a take-up reel 13. The optical film 1 is continuously driven by a capstan 14 and a pinch roller 15 at a rate, for example, of 60 picture frames per second. When the optical film 1 is passed through the scanning area, the same is illuminated by a luminance spot moving in a transverse direction on a cathode ray tube 17 through a lens 18. The luminance spot 5 will repeatedly illuminate the optical film 1 at one half of the 15.75 KHZ frequency, namely, at 7.875 KHZ. Since the horizontal scanning luminance spot 5 which moves in the transverse direction will read two lines 6a, 6b of the color video information shown in FIG. 2, then the horizontal frequency of the lines is 15.7 KHZ.

As previously stated, since one frame consists of two picture frames, then in accordance therewith, the color video information will be read at the rate of 30 frames per second as the film is supplied. The color video information as read in accordance with the above is then converted into an electrical signal by a photoelectric transducer 19. The electrical signal so generated will have the frequency spectrum shown in FIG. 3. The output signal of the photoelectric transducer is then amplified by conventional video signal amplifier 20 and supplied to a loW pass filter 21, for filtering out any luminance signal that is present and below the frequency of 3.6 MHZ. The luminance signal is then composed in a conventional synchronizing pulse mixer 22 by mixing the same with the horizontal and vertical synchronizing signal A which appears at the output of a conventional synchronizIng pulse former 26 whereby the video signal is formed into a pattern in accordance with the National Television System Committee. The video signal at the output of the synchronizing pulse mixer 22 is then applied to a conventional matrix circuit 24 through a delay element 23.

It should be understood that the output of the video signal amplifier 20 is also supplied to a synchronizing pulse separator 25 so that the signals which correspond to the horizontal and vertical synchronizing signals can be readily separated. The resulting signal is then formed in the synchronizing pulse former 26 so that the horizontal and vertical synchronizing signal A will consist of a horizontal synchronizing signal at a frequency of 15.75 KHZ and a vertical synchronizing signal at a frequency of 60 HZ. The horizontal and vertical synchronizing signals A are then mixed with the luminance signal in the synchronizing pulse mixer 22, as explained above. The horizontal and vertical synchronizing signal A is delayed for a specific time in a delay circuit 27 and the theoretical product of the horizontal scanning signal B is gated with the signal A in an AND circuit 28. The output D of the AND circuit 28 then operates a switching signal generator 29 to provide a line switching signal E.

It should further be understood that the output of the video amplifier 20 is also supplied to a bandpass filter 30 having a frequency bandpass of 3.7 to 4.7 MHZ for filtering out the desired color signals. The filtered color signals will then alternately contain a signal component of (R-Y) and a signal component of (B-Y) for every other line. The color signal is then supplied to a first switch 31 and a 1H (horizontal time) delay element 32. The color signal passed through the 1H delay element 32 and then applied to a second switch 33 will be delayed for 1 horizontal scanning period, and is the signal which is obtained by the flying spot scanner prior to the single horizontal scanning time and to that extent differs from the color signal which is passed through the first switch 31. It should be apparent that the first switch 31 and the second switch 33 will change the output lines by the line switching signal E at the output of the switching signal generator 29. The output lines will be respectively changed at the rising and falling times of the line switching signal E. It should also be apparent that the output lines of the first switch 31 and the second switch 33 are not connected at the same time to the same demodulator. Thus, the color signal comprising the (R-Y) signal component at the output of the first switch 31 and the second switch 33 is supplied to an (R-Y) demodulator 34, while the color signal comprising the (B-Y) signal component is supplied to a (B-Y) demodulator 35. Each of the color signals, namely, the (R-Y) signal and the Y) signal after being respectively demodulated by the Y) demodulator 34 and the (B-Y) demodulator 35 is then supplied to a matrix circuit 24, wherein the color difference signal (G-Y) is produced, along with the luminance signal passed through the delay element 23. The resulting four types of signals, i.e., the luminance signal, the color difference signals (R-Y) and (B-Y) and the (G-Y) signal, are then applied to a conventional television monitor 36 whereby the desired color video from the recorded media on the film 1 is readily reproduced.

A horizontal drive pulse generator 37 is provided for driving the cathode ray tube 17 of the flying spot scanner and for generating the horizontal scanning signal B. The horizontal scanning signal drives a conventional scanner 38 so that a sawtooth voltage C for horizontal scanning is supplied to the cathode ray tube 17. At the same time, the horizontal scanning signal B is supplied to the AND circuit 28 along with the delayed horizontal and vertical synchronizing reading signal A' for enabling the product D to thereby be formed. It should be understood that the horizontal scanning signal B at the output of the horizontal drive pulse generator has a frequency of 7.875 KHZ which is half that of the frequency of the horizOntal synchronizing signal P. When the horizontal scanner 38 is driven by the horizontal scanning signal B, the sawtooth-shaped voltage waveform will be obtained at the output of the horizontal scanner 38.

In accordance with the above, the luminance spot 5 of the cathode ray tube 17 will scan the optical film 1 in a horizontal direction at a frequency of 7.875 KHZ. The frequency of the horizontal video signal which is read by the horizontal scanning spot 5, as shown in FIG. 1, will be at the conventional television frequency of 15.75 KHZ.

Figure 5A:
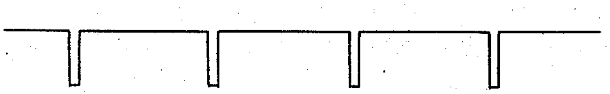
Figure 5:
Figure 5B:
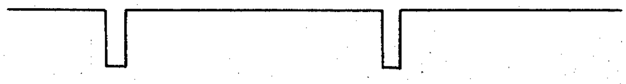
Figure 5C:
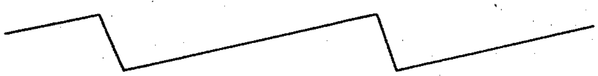

FIG. 5 shows typical timing diagrams for various locations in the embodiment of FIG. 4 with the letters in FIG. 5 corresponding to the letter locations of FIG. 4. Thus, the synchronizing signals which are read by the flying spot scanner are separated in the synchronizing pulse separator 25 and formed in the synchronizing pulse former 26 to provide the signal shown in FIG. 5A. In FIG. 5A, only the horizontal synchronizing signal is shown. After the signal A is delayed by the delay circuit 27, the rise time thereof will be slightly delayed in comparison with the rise time of the horizontal scanning signal B. The delayed waveform is shown in FIG. 5A' and the scanning signal is shown in FIG. 5B. The product of the signal A' and the horizontal scanning signal B which is obtained at the output of the AND circuit 28 is shown in FIG. 5D.

Figure 5D:
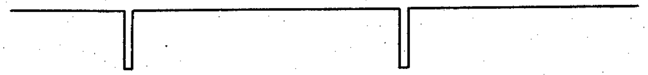
Figure 5E:
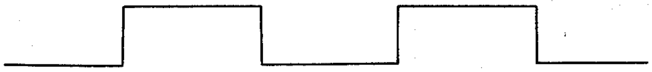

In FIG. 5D, it can be seen that the signal D are pulses which rise at the period of time that the luminance spot 5 horizontally scans from the left edge to the right edge of the film. The line switching signal E which is shown in FIG. 5E is produced by operating the switching signal generator 29 with the signal D. It should be understood that the switching signal generator 29 may be, for example, a stable multi-vibrator which is triggered with the signal D to produce the line switching signal E which has a 50 percent duty cycle. The output lines of the first switch 31 and the second switch 33 are switched at the period of time of the rising and falling of the line switching signal E.

Figure 5F:
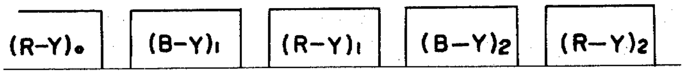
Figure 5G:
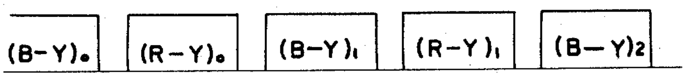

The output signal F of the bandpass filter 30, as shown in FIG. 5F, alternately forms the (R-Y) and the (B-Y) signals a line at a time. If the signal is delayed for one horizontal scanning time, through the 1H delay element 32, then the signal shown in FIG. 5G is produced. The two signals F and G are respectively supplied to the switch 31 and the switch 33 and the output lines thereof are then switched by the line switching signal E such that the (R-Y) signal H, shown in FIG. 5H, is applied to the (R-Y) demodulator, and the (B-Y) signal I, shown in FIG. 5I, is applied to the (B-Y) demodulator 35.

Figure 5H:
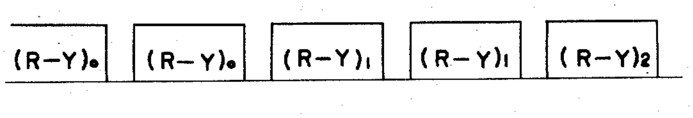
Figure 5I:
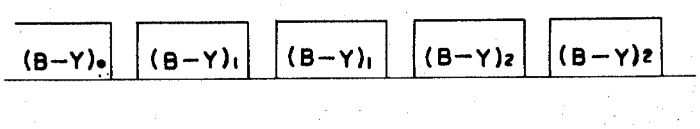

As shown in FIG. 5H, the (R-Y) signal H forms a line having two of the same signal components for two horizontal scanning terms, such, for example, as $(R\text{-}Y)_0$, $(R\text{-}Y)_0$, $(R\text{-}Y)_1$, $(R\text{-}Y)_1$, $(R\text{-}Y)_2$, . . . etc. On the other hand, as shown in FIG. 5I, the (B-Y) signal I forms a line having two of the same (B-Y) signal components for two horizontal scanning terms. The two color difference signals are respectively demodulated by the (R-Y) demodulator 34 and the (B-Y) demodulator 35 and then applied to the matrix circuit 24. As stated above, when the line switching signal E is produced from the horizontal and vertical synchronizing signal A and the horizontal scanning signal B, then the switching operation for the output lines of the first switch 31 and the second switch 33 can be accurately obtained. Moreover, in light of the above, it is unnecessary to record on the optical film a mark for providing a signal for line switching, and as such, the effective area of the optical film can be increased.

Obviously, many modifications and variations of the present invention are possible in light of the above teachings. Thus, for example, instead of the color difference signal (R-Y) and (B-Y) referred to in the above-described embodiment, color signals, such as I, Q, or X,Z can readily be employed for modulating a color carrier wave. Also, it should be obvious that modulation systems other than that of the frequency modulation type can be readily employed. Moreover, while the recorded video information lines *6a*, *7a*, a, or *6b*, *7b*, *8b* as shown in FIG. 2 appear to be separated from each other, it should be understood that the gaps therebetween can be reduced to a width corresponding to the size of the luminance scanning spot. It should also be apparent that in the present invention, even though the luminous spot will not accurately move on one line and therefore will overlap with an adjacent line, it is quite rate that a beat signal between the color signals will occur and if it does, the same is of a very small value, since both of the overlap color signals are of the same type. It is therefore understood that within the scope of the appended claims, the invention may be practiced otherwise than as specifically described herein.

What is claimed as new and desired to be secured by letters patent of the United States is:

1. An apparatus for reproducing video information which utilizes a recording media wherein video information thereon is divided into a plurality of horizontal areas, said horizontal areas being sequentially recorded in the direction of movement of said recording media which comprises:

a first horizontal section and a second horizontal section for recording each of said plurality of horizontal areas on said recording media, said first horizontal section and said second horizontal section being adjacent;

a luminance signal and a first color signal of said video information being recorded on said first horizontal section and a luminance signal and a second color signal of said video information being recorded on said second horizontal section;

means for providing a horizontal scanning signal;

means for reading said signals recorded on said first horizontal section and said second horizontal section by scanning in a direction transverse to that of the recording media to produce a composite signal;

means for deriving said first and second color signals from said composite signals;

means for delaying each of said color signals for a period equal to the time required to scan a horizontal section;

first and second demodulator circuits;

switching means for alternately applying delayed and non-delayed first color signals to said first demodulator during a first period of time, and for alternately applying delayed and non-delayed second color signals to said second demodulator during a second period of time; and, means responsive to said horizontal scanning signal and to said detected video information for producing a switching signal at the horizontal scanning frequency.

2. An apparatus for reproducing video information according to claim 1, wherein said means for delaying each of said color signals includes switching the signals supplied to said first and said second color demodulation circuits during said first and said second periods in accordance with means for detecting a synchronizing signal which is recorded between the first horizontal section and the second horizontal section of said recording media and between the side edge of said recording media and said first or second horizontal sections.

* * * * *